US012650939B2

(12) United States Patent
Baumann et al.

(10) Patent No.: US 12,650,939 B2
(45) Date of Patent: Jun. 9, 2026

(54) HARDWARE PARTITIONS FOR A CLOUD SERVER

(71) Applicant: Google LLC, Mountain View, CA (US)

(72) Inventors: Andrew Arnott Baumann, Zurich (CH); Jonathan Charles Masters, Mountain View, CA (US); Ori Isachar, Herzliya (IL); Liran Fishel, Ra'anana (IL); David Dayan, Kfar Vitkin (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/790,677

(22) Filed: Jul. 31, 2024

(65) Prior Publication Data

US 2026/0037459 A1        Feb. 5, 2026

(51) Int. Cl.
G06F 3/06 (2006.01)
G06F 13/24 (2006.01)

(52) U.S. Cl.
CPC .............. G06F 13/24 (2013.01); G06F 3/061 (2013.01); G06F 3/0664 (2013.01); G06F 3/067 (2013.01)

(58) Field of Classification Search
None
See application file for complete search history.

(56) References Cited

U.S. PATENT DOCUMENTS

| | | | |
|---|---|---|---|
| 9,928,080 | B2 | 3/2018 | Boenisch |
| 2005/0125580 | A1 | 6/2005 | Madukkarumukumana et al. |
| 2008/0126652 | A1 | 5/2008 | Vembu et al. |
| 2015/0254473 | A1 | 9/2015 | Frazier et al. |
| 2018/0232320 | A1 | 8/2018 | Raval et al. |
| 2020/0409735 | A1* | 12/2020 | Grandhi ................ G06F 9/4812 |
| 2023/0267080 | A1 | 8/2023 | Zhen |

OTHER PUBLICATIONS

Extended European Search Report for European Application No. 25188617.2, mailed Dec. 8, 2025, 10 Pages.

* cited by examiner

*Primary Examiner* — Scott C Sun
(74) *Attorney, Agent, or Firm* — Lowenstein Sandler LLP

(57) ABSTRACT

A system comprises one or more processor cores, including a management processor core that executes instructions to partition at least a portion of the one or more processor cores into one or more partitions. The system includes at least one distributed virtual memory (DVM) hub that obtains a first DVM message from a processor core; determines, based on a processor core identifier of the DVM message, one or more recipient processor cores for the first DVM message; and provides the first DVM message to the one or more recipient processor cores. The system includes one or more interrupt interposers that are each associated with a processor core and prevent an interrupt originating from the associated processor core from being provided to a processor core that is outside the partition of the associated processor core.

20 Claims, 7 Drawing Sheets

<u>400</u>

┌─────────────────────────────────────────────┐
│ <u>410</u>                                    │
│ Partition one or more processor cores into    │
│ one or more partitions                        │
└─────────────────────────────────────────────┘

┌─────────────────────────────────────────────┐
│ <u>420</u>                                    │
│ Configure a DVM hub to obtain a first DVM     │
│ message, determine one or more recipient      │
│ processor cores for the first DVM message,    │
│ and provide the first DVM message to the one  │
│ or more recipient processor cores             │
└─────────────────────────────────────────────┘

┌─────────────────────────────────────────────┐
│ <u>430</u>                                    │
│ Configure an interrupt interposer to be       │
│ associated with a first processor belonging   │
│ to the first partition                        │
└─────────────────────────────────────────────┘

┌─────────────────────────────────────────────┐
│ <u>440</u>                                    │
│ Configure the interrupt interposer to prevent │
│ a first interrupt originating from the first  │
│ processor core from being provided to a       │
│ processor core that is outside of the first   │
│ partition                                     │
└─────────────────────────────────────────────┘

510
Obtain a DVM message handling configuration

520
Obtain a first DVM message from a first processor core

530
Determine one or more recipient processor cores for the first DVM message

540
Provide the first DVM message to the one or more recipient processors

600

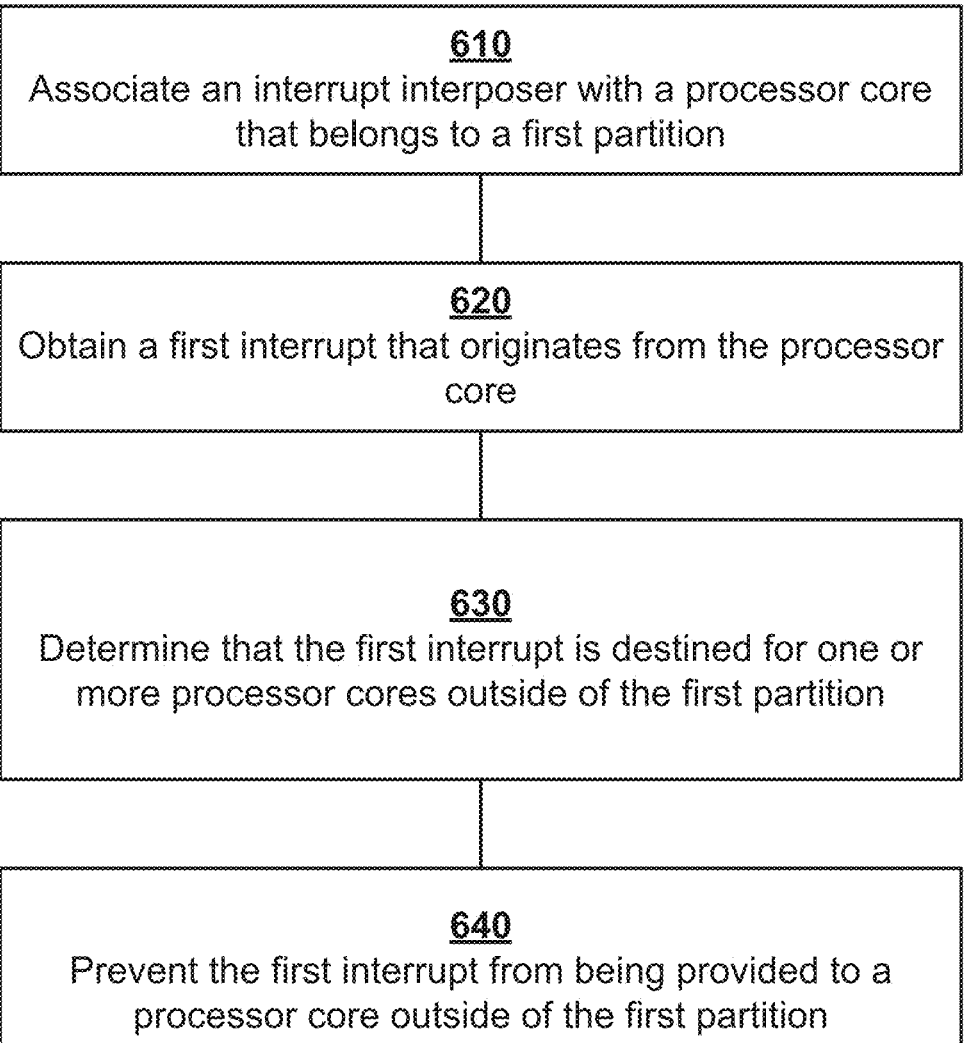

610
Associate an interrupt interposer with a processor core that belongs to a first partition

620
Obtain a first interrupt that originates from the processor core

630
Determine that the first interrupt is destined for one or more processor cores outside of the first partition

640
Prevent the first interrupt from being provided to a processor core outside of the first partition

FIG. 6

HARDWARE PARTITIONS FOR A CLOUD SERVER

TECHNICAL FIELD

The instant specification generally relates to computing devices. More specifically, the instant specification relates to hardware partitions for a cloud server.

BACKGROUND

Cloud computing includes network-based computing in which collections of computing devices (e.g., servers, processing units, data storage devices) and software (e.g., computer programs, database tools) provide computational resources and data storage to remote end users. A cloud server typically includes hardware (e.g., processor devices, memory devices, IO devices, etc.) used to implement software executing on the cloud server.

SUMMARY

Disclosed herein are systems and methods for hardware partitions for a cloud server. One aspect of the disclosure includes a system. The system includes one or more processor cores. A first processor core of the one or more processor cores executes instructions to partition at least a portion of the one or more processor cores into one or more partitions. The system includes at least one distributed virtual memory (DVM) hub. The DVM hub obtains a first DVM message from a second processor core of the one or more processor cores, and the first DVM message includes a processor core identifier of the second processor core. The DVM hub determines, based on the processor core identifier, one or more recipient processor cores of the one or more processor cores for the first DVM message. The DVM hub provides the first DVM message to the identified one or more recipient processor cores. The system includes one or more interrupt interposers. Each interrupt interposer is associated with a processor core of the one or more processor cores, and the associated processor core belongs to a partition of the one or more partitions. Each interrupt interposer prevents a first interrupt originating from the associated processor core from being provided to a processor core that is outside the partition of the associated processor core.

Another aspect of the present disclosure includes a method. The method includes partitioning one or more processor cores into one or more partitions. The method includes configuring at least one DVM hub to (1) obtain a first DVM message from a first processor core of the one or more processor cores, the first DVM message including a processor core identifier of the first processor core; (2) determine, based on the processor core identifier of the first DVM message, one or more recipient processor cores of the one or more processor cores for the first DVM message; and (3) provide the first DVM message to the identified one or more processor cores. The method includes configuring an interrupt interposer to be associated with a first processor core of the one or more processor cores. The first processor core belongs to the first partition. The method includes configuring the interrupt interposer to prevent a first interrupt originating from the first processor core from being provided to a processor core that is outside of the first partition.

Another aspect of the present disclosure includes a non-transitory computer-readable storage medium that includes instructions. The instructions, when executed by a processing device, cause the processing device to perform operations. The operations include configuring at least one DVM hub to (1) obtain a first DVM message from a first processor core of the one or more processor cores, the first DVM message including a processor core identifier of the first processor core; (2) determine, based on the processor core identifier of the first DVM message, one or more recipient processor cores of the one or more processor cores for the first DVM message; and (3) provide the first DVM message to the identified one or more processor cores. The operations include configuring an interrupt interposer to be associated with a first processor core of the one or more processor cores. The first processor core belongs to the first partition. The operations include preventing, at the interrupt interposer, a first interrupt originating from the first processor core from being provided to a processor core that is outside of the first partition.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 4 depicts a flowchart illustrating an example method for practicing some aspects of the present disclosure, in accordance with one or more embodiments.

FIG. 6 depicts a flowchart illustrating an example method for practicing some aspects of the present disclosure, in accordance with one or more embodiments.

DETAILED DESCRIPTION

Figure 1:
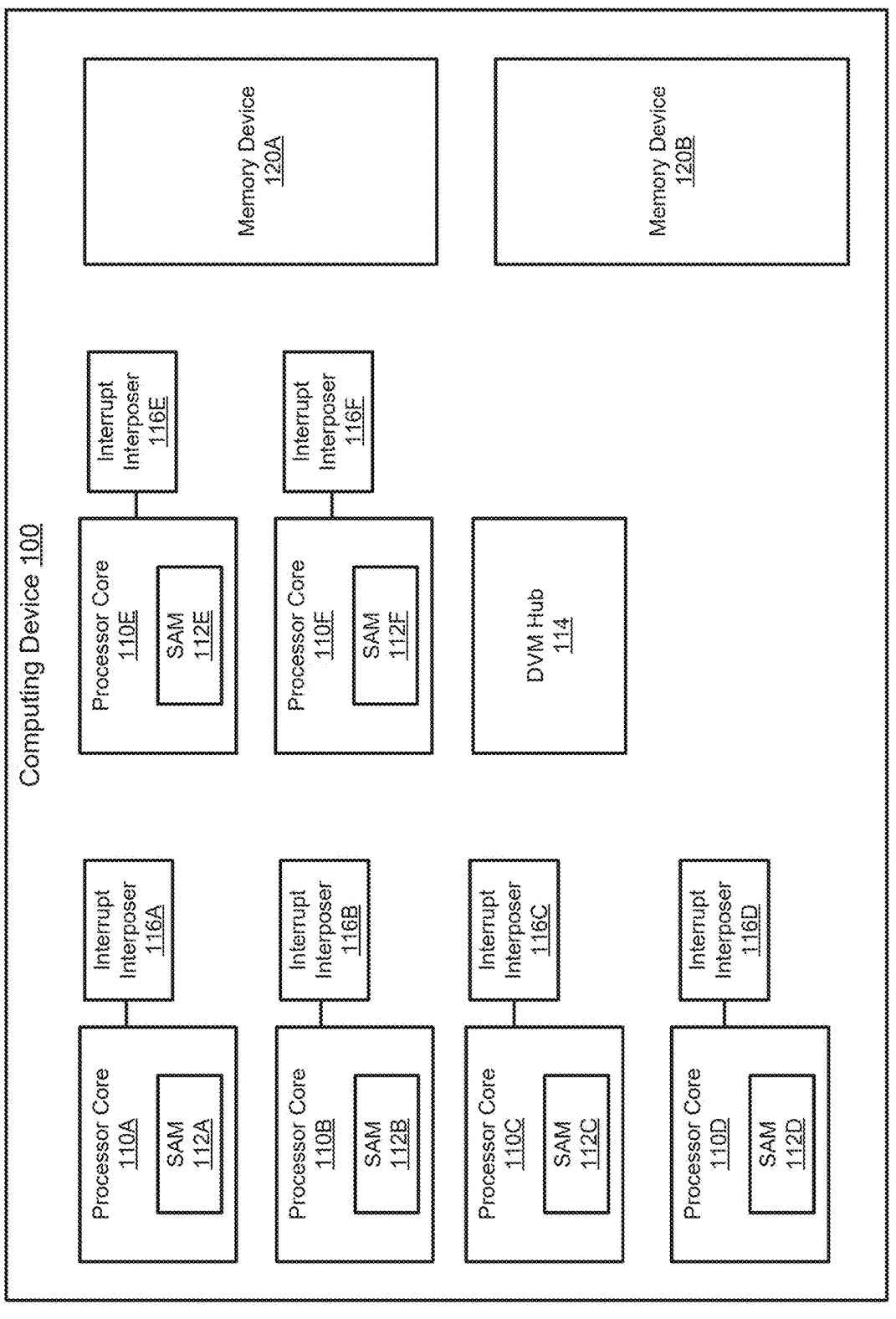
FIG. 1 schematically illustrates an example computing device for hardware partitions for a cloud server in which some aspects of the present disclosure may be implemented, in accordance with one or more embodiments.

A cloud provider can provide a cloud computing environment to a customer end user. Cloud providers typically offer two types of cloud computing environments: a bare-metal cloud computing environment and a virtual machine (VM) cloud computing environment. In a bare-metal cloud environment, the cloud provider dedicates an entire cloud server to the customer end user. The customer end user can then use all of the computing resources of the cloud server (e.g., processor devices, memory devices, input/output (IO) devices, etc.). While the customer end user using the bare-metal cloud environment does not share any computing resources with other customers of the cloud provider, the customer end user typically has to pay for the entire cloud server, even if the customer end user does not use all of the computing resources of the cloud server.

In the VM cloud environment, the customer end user may select the desired computing resources configuration of the VM (e.g., the number and types of processor devices, the amount of memory, the amount of storage space, the types of IO devices, etc.), and the cloud provider can use a hypervisor to create the VM with the selected configurations and run the VM. The hypervisor can run the VM on multiple cloud servers due to computing resource availability. If the customer end user only uses the portion of the cloud server's hardware that the VM needs, the VM can share the cloud server's computing resources with other customers' VMs, which can use computing resources and can be used as a vector for attacks on the customer end user's VM. Furthermore, the VM is managed by a hypervisor, which can use computing resources of the cloud server(s) and can also be used as a vector for attacks on the customer end user's VM.

Aspects and implementations of the present disclosure address the above deficiencies, among others, by providing a cloud computing system that statically partitions a cloud server's computing resources so that the customer end user only uses computing resources that it requests (unlike a bare-metal cloud environment) and so that different cloud provider customers do not use the same computing resources or a hypervisor (unlike a VM cloud environment). The system may include multiple processor cores. One of the processor cores, e.g., a management core, can execute instructions (e.g., firmware) that can partition at least a portion of the other processor cores into one or more partitions. The instructions can configure the processor cores such that they are unable to communicate with or cause actions to be performed on processor cores outside of their respective partitions.

In some implementations, the system includes at least one distributed virtual memory (DVM) hub. The DVM hub can obtain a DVM message (e.g., a transaction lookaside buffer (TLB) invalidation instruction) from a processor core, the DVM message may include a processor core identifier that identifies which processor core generated or sent the DVM message. The DVM hub can determine, based on the processor core identifier of the DVM message, one or more recipient processor cores for the DVM message. The recipient processor core(s) may include the processor core(s) that belong to the same partition as the processor core that generated or sent the DVM message. The DVM hub can provide the DVM message to those recipient processor core(s). The DVM hub can perform one or more preventative actions associated with the DVM message.

In some implementations, the system includes one or more interrupt interposers. An interrupt interposer can be associated with a processor core. The interrupt interposer can prevent an interrupt originating from the associated processor core from being provided to a processor core that is outside the partition to which the associated processor core belongs. The system can include other components that prevent components from one partition acting on another partition. For example, the instructions that partition the processor cores can configure a system address map (SAM) of a processor core so that the processor core can only access a block of memory that has been assigned to the partition to which the processor core belongs. The system may include instructions (e.g., firmware) that causes a processor core to emulate one or more IO devices such that there is a logical separation of partitions regarding IO devices.

Some benefits of the present disclosure may provide a technical effect caused by or resulting from a technical solution to a technical problem. For example, one technical problem may relate to the inefficient use of computing resources resulting from bare-metal cloud environments where the customer end user is allocated an entire cloud server but may not use all of the computing resources of the cloud server. One of the technical solutions to the technical problem may include using the system disclosed herein where the computing resources are partitioned such that they are efficiently used by different customer end users. As a consequence, wasted computing resources are reduced or eliminated. One technical problem may relate to a hypervisor using computing resources that could be used, instead, by customer end user software. One of the technical solutions to the technical problem may include the system disclosed herein where no hypervisor is used, allowing the customer end users to use the computing resources. As a consequence, computing resources used by customer end users instead of the cloud provider are increased. Another technical problem may relate to security vulnerabilities in the hypervisor or a processor core that can serve as vectors for an attack. One of the technical solutions to the technical problem may include the system disclosed herein where no hypervisor is used, and communications, interrupts, etc. from one partition are not perpetuated or accepted by another partition. As a consequence, such security vulnerabilities are mitigated or eliminated.

FIG. 1 is a schematic block diagram illustrating an example computing device 100, in accordance with some embodiments. The computing device 100 may include a computing device 100 used in a cloud computing system. For example, the computing device 100 may include a cloud server, a cloud system on a chip (SoC), or some other computing device 100 that can be included in a cloud computing system.

A cloud computing system may include one or more computing devices (or portions of cloud computing devices) provided to an end user by a cloud provider. An end user can utilize a portion of the cloud computing system to host content for use or access by other parties or perform other computational tasks. In some implementations, the cloud computing system is configured to allow the end user to use a portion of a computing device 100 (e.g., only certain hardware, software, or other computer system resources). The cloud computing system may include a private cloud, a public cloud, or a hybrid cloud. The cloud computing system can provide infrastructure-as-a-service (IaaS), platform-as-a-service (PaaS), or software-as-a-service (SaaS) computing. The cloud computing system can provide serverless computing.

In one implementation, the computing device 100 includes one or more processor cores 110A-F. One or more of the processor cores 110A-F may include a respective system address map (SAM) 112A-F. The computing device 100 may include one or more distributed virtual memory (DVM) hubs 114. The computing device may include one or more interrupt interposers 116A-N. The computing device 100 may include one or more memory devices 120A-B. While the example computing device 100 of FIG. 1 includes six of each of the processor cores 110A-F, SAMs 112A-F, and interrupt interposers 116A-F, the computing device 100 can include other numbers of such components. The computing device 100 may include more than one DVM hub 114. The computing device 100 can include other numbers of memory devices 120A-B.

In some implementations, a processor core 110 includes an electronic device that executes instructions. A processor core 110 may include an arithmetic logic unit (ALU) for performing calculations, a control unit to retrieve and decode instructions, or registers for temporary data storage. A processor core 110A can operate independently or can collaborate with other processor cores 110B-F. A processor core 110 may sometimes be referred to as a "processing element" or "PE."

In one implementation, a first processor core 110A of the one or more processor cores 110A-F includes instructions that partition at least a portion of the computing resources of the computing device 100 into one or more partitions. Computing resources that can belong to a partition may include a processor core 110, a SAM 112, a DVM hub 114, an interrupt interposer 116, a block of memory of a memory device 120, or other computing resources. The first processor core 110A may include instructions that manage the one or more partitions. The instructions may include firmware or other software. The first processor core 110A can be referred to as a "management core."

In some implementations, the instructions that partition the one or more computing resources of the computing device 100 can execute on an electronic device separate from the computing device 100. The separate electronic device can be dedicated to partitioning the one or more processor cores 110A-F and managing the one or more partitions. The instructions can execute on a microcontroller located on the computing device 100 or in data communication with the components of the computing device 100.

In one or more implementations, as used herein, a "partition" refers to a collection of computing resources configured, by instructions of the management core, to not affect computing resources of another partition and/or to not be affected by communications from computing resources of another partition. In one or more implementations, a computing resource belongs to one and only one partition.

In on implementation, a DVM hub 114 may not belong to a partition. However, partitioning at least a portion of the computing resources of the computing device 100 into one or more partitions may include configuring one or more processor cores 110A-F to provide DVM messages to the DVM hub 114. Where the computing device 100 includes multiple DVM hubs 114, configuring the one or more processor cores 110A-F to provide DVM messages to a DVM hub 114 may include configuring each processor core 110A-F to provide DVM messages to a specific DVM hub 114 (e.g., configuring processor cores 110B-D to provide the DVM messages they generate to a first DVM hub 114, and configuring processor cores 110E-F to provide the DVM messages they generate to a second DVM hub 114).

In some implementations, the management core 110A partitions one or more processor cores 110A-F into a partition responsive to receiving a command, instruction, etc. from a managing computing device of the cloud computing system. The managing computing device may include a cloud management computing device, a hypervisor, or some other managing computing device for the cloud computing system. The managing computing device can provide the command, instruction, etc. in response to an end user of the cloud computing system requesting cloud computing resources. The command, instruction, etc. may include data specifying a configuration of the requested partition (e.g., the number of processor cores 110; the types, processing power, etc. of the processor cores 110; an amount of memory; an amount of storage space; etc.).

In one or more implementations, the management core 110A is further configured to shut down a partition. The management core 110A can shut down a partition responsive to receiving a command, instruction, etc. from the managing computing device. Shutting down a partition may include rebooting the components of the partition. Rebooting a component of the partition may include reverting the component to a state as if the computing device 100 had been rebooted. For example, rebooting a processor core 110 may include clearing one or more caches or registers, the SAM 112, or other components of the processor core 110. Rebooting a DVM hub 114 or an interrupt interposer 116 may include clearing data from such components. Rebooting a block of memory allocated to the partition may include clearing out the block of memory (e.g., overwriting the block of memory with null or garbage values, etc.). The rebooted components of the partition can then be used as components in one or more other partitions (e.g., a newly created partition).

In some implementations, the processor core 110A on which the instructions that partition the one or more components of the computing device 100 into one or more partitions execute includes a processor core 110 dedicated to executing such instructions. The processor core 110A may not form part of any partition. In one or more implementations, the processor core 110A dedicated to executing the instructions does not include an associated DVM hub 114 or interrupt interposer 116A. In some implementations, the managing computing device of the cloud computing system selects, as the processor core for executing the instructions, a processor core 110 that is not currently being used or that is not currently part of a partition.

In one implementation, the computing device 100 includes one or more SAMs 112A-F. For example, as seen in FIG. 1, each processor core 110A-F may include a respective SAM 112A-F. A SAM 112 may include one or more entries, and each entry may include a block of memory and a corresponding channel of a mesh interconnect, and the channel can lead to the block of memory. Further details regarding the SAMs 112A-F are discussed below in relation to FIG. 2.

The computing device 100 may include one or more DVM hubs 114. DVM may include a memory management technique used in a multi-processor system (such as the computing device 100) to manage memory efficiently and transparently across multiple processor cores 110A-F. DVM can create an abstraction of a single, unified memory space accessible by multiple processors even though the physical memory is physically distributed across different locations (e.g., across the memory devices 120A-B). In some implementations, a first processor core 110B sends a DVM message (sometimes referred to as a "DVM operation" or a "transaction") to be received by another processor core 110C in order to maintain the DVM of the computing device 100. A DVM hub 114 may include a component that is disposed in between two processor cores of the one or more processor cores 110A-F. In one implementation, the management core 110A configures a DVM hub 114 to obtain a DVM message from a processor cores 110, determine which other processor cores 110 should receive the DVM message, and provide the DVM message to those processor cores 110. The management core 110A may configure the one or more DVM hubs 114 to perform a preventative action associated with the DVM message. Further information regarding the one or more DVM hubs 114 is provided further below.

The computing device 100 may include one or more interrupt interposers 116A-F. An interrupt interposer 116B may include a component that is disposed in between an associated processor core 110B and another processor core 110A, C-F of the one or more processor cores 110A-F. The management core 110A may configure an interrupt interposer 116B to prevent a first interrupt that originates from the associated processor core 110B from being provided to a processor core 110A, C-F that is outside of the partition of the associated processor core 110B. An interrupt may include a request for a processor core 110 to suspend currently executing code in order to process an event. An interrupt may include a hardware interrupt or a software interrupt (e.g., a software-generated interrupt (SGI)). Further information regarding the interrupt interposers 116A-F is discussed further below.

In one implementation, a memory device 120 may include a data storage device that can store data for use by at least some of the one or more processor cores 110A-F of the computing device 100. A memory device 120 may include random-access memory (RAM) or some other type of volatile data storage. In some implementations, the computing device 100 may include other types of computing resources (e.g., non-volatile data storage, an IO device, or other types of computing resources) that the management core 110A can allocate (or can allocate a portion thereof) to a partition.

Figure 2:
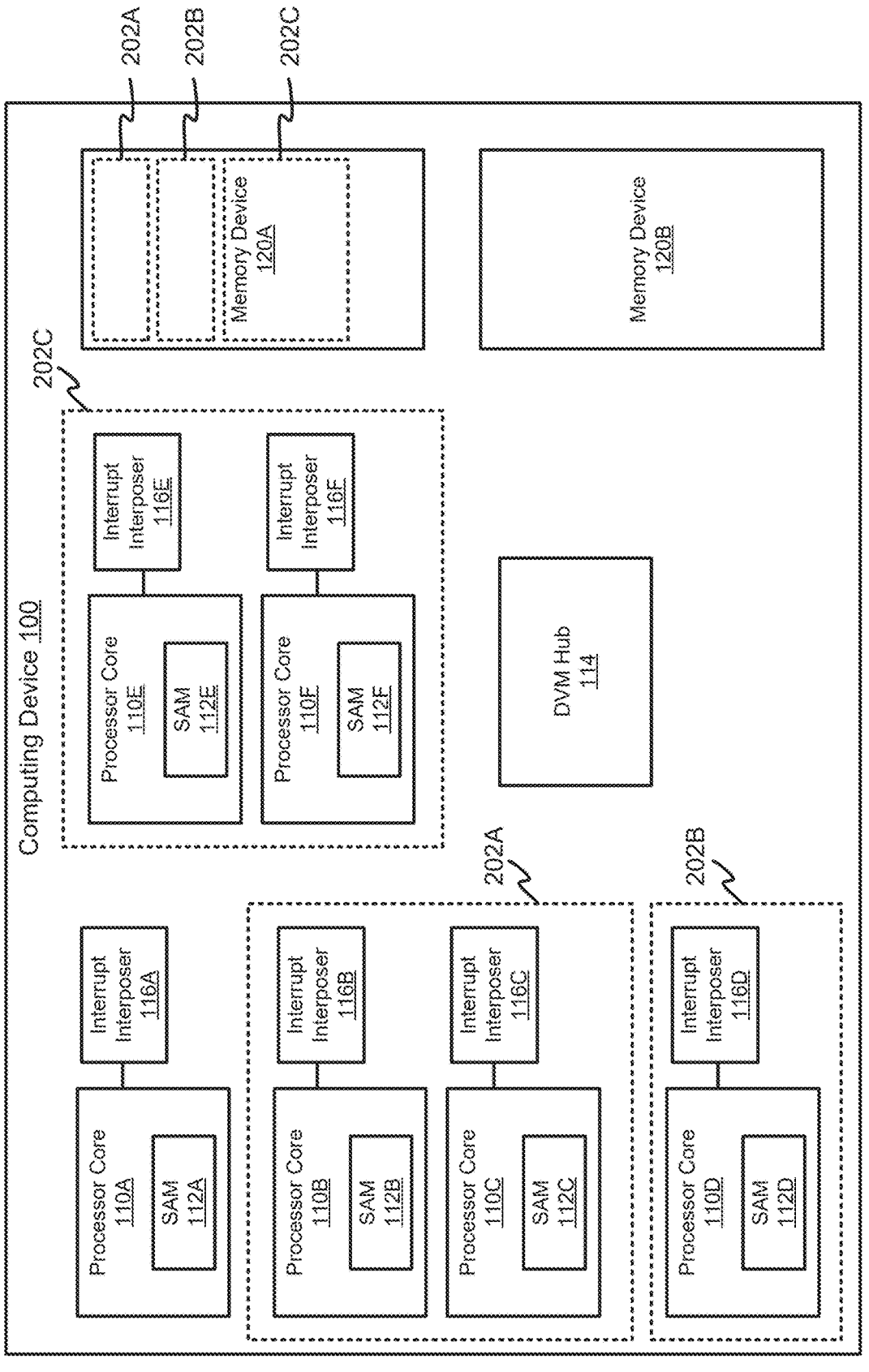
FIG. 2 schematically illustrates an example computing device for hardware partitions for a cloud server where certain components have been partitioned into multiple partitions and in which some aspects of the present disclosure may be implemented, in accordance with one or more embodiments.

FIG. 2 depicts an example computing device 100 that has been partitioned by the firmware of a management core 110A. The firmware of the processor core 110A can partition the remaining processor cores 110B-F into three partitions 202A-C: (1) a first partition 202A that includes the processor cores 110B-C, the interrupt interposers 116B-C, and the block of memory 0x00000000-0x37FFFFFF of the memory device 120A; (2) a second partition 202B that includes the processor core 110D, the interrupt interposer 116D, and the block of memory 0x38000000-0x6FFFFFFF of the memory device 120A; and (3) a third partition 202C that includes the processor cores 110E-F, the interrupt interposers 116E-F, and the block of memory 0x70000000-0xDFFFFFFF of the memory device 120A. The DVM hub 114 may not belong to a partition 202, but the management core 110A may configure the DVM hub 114 to obtain DVM messages from the processor cores 110B-F and provide the DVM messages to recipient processor cores 110B-F, as explained below. While the computing device 100 of FIG. 2 includes three partitions 202A-C with various numbers of processor cores 110B-F and various sizes of memory blocks, the computing device 100 can include other numbers of partitions 202, and the partitions can have other numbers of processor cores 110, memory block sizes, or other component configurations.

As discussed above, a SAM 112 may include one or more entries that each can map a block of memory to a corresponding destination of a mesh interconnect. A destination can lead to the corresponding block of memory. For example, a first processor core 110A may access four blocks within the first memory device 120A. The SAM 112A of the processor core 110A may be:

| Memory Block | Destination |
|---|---|
| 0x00000000-0x37FFFFFF | 1 |
| 0x38000000-0x6FFFFFFF | 2 |
| 0x70000000-0xA7FFFFFF | 3 |
| 0xA8000000-0xDFFFFFFF | 4 |

In some implementations, the computing device 100 includes a mesh interconnect. The mesh interconnect may include one or more channels from the one or more processor cores 110A-F to one or more blocks of memory of the memory devices 120A-B. A single processor core 110A may include multiple channels from the processor core 110A to different blocks of memory of the memory devices 120A-B. In some implementations, channels from different processor cores 110A-F lead to the same block of memory.

In some implementations, a SAM 112 is associated with a partition 202 of the one or more partitions 202A-C. For example, as discussed above, each processor core of the one or more processor cores 110A-F may include a respective SAM 112. In another example, a subset of the one or more processor cores 110A-F of a partition 202 may include a respective SAM 112. In some implementations, a SAM 112 is stored in a separate electronic device assigned to the associated partition 202.

A SAM 112 can restrict memory accesses to one or more blocks of physical address space allocated to the partition 202 associated with the SAM 112. The physical address space can refer to memory, a memory-mapped IO device, or some other component that can be referred to by a physical address. In one implementation, the management core 110A that partitions processor cores 110B-F into the one or more partitions 202A-C configures the SAMs 112B-F to only include entries to blocks of memory that are assigned to the partition 202 associated with the SAMs 112B-F. For example, as discussed above, the first partition 202A may include the processor cores 110B-C, the interrupt interposers 116B-C, and the block of memory 0x00000000-0x37FFFFFF of the memory device 120A. The management core 110A can remove, from the SAMs 112B-C, any entries that include memory addresses outside of the block of memory 0x00000000-0x37FFFFFF.

In some implementations, by removing, from a SAM 112, entries that reference portions of memory that are not allocated to the partition 202, the processor cores 112A-F assigned to that partition 202 cannot access portions of memory assigned to other partitions 202 and, thus, cannot interfere with the memory assigned to the other partitions 202.

In one implementation, the management core 110A partitioning the computing resources into the one or more partitions 202A-C includes the management core 110A configuring the processor cores 110B-F and one or more DVM hubs 114. In a conventional computing device that uses DVM, when a processor core 110 sends a DVM message, the DVM message is received by all other processor cores 110 of the conventional computing device. However, for the computing device 100 using the one or more partitions 202, if a first processor core 110B sends a DVM message, the DVM message should not be received by processor cores 110 outside of the first processor core's 110B partition. 202 Thus, the management core 110A can configure the processor cores 110B-F and one or more DVM hubs 114 such that DVM messages are only sent and received within the same partition 202, as discussed below.

The management core 110A can assign each processor core 110B-F to provide DVM messages generated by the respective processor core 110B-F to a specific DVM hub 114. In one example, where the computing device 100 includes a single DVM hub 114, the management core 110A can assign each processor core 110B-F to provide their respective DVM messages to the single DVM hub 114. In another example, where the computing device 100 includes two DVM hubs 114, the management core 110A can assign processor cores 110B, D, and E to provide their respective DVM messages to a first DVM hub 114 and assign processor cores 110C and F to provide their respective DVM messages to a second DVM hub 114. In some implementations, a DVM hub 114 may be in data communication with each processor core 110A-F. In other implementations, a DVM hub 114 may not be in data communication with one or more processor cores 110. Thus, to obtain DVM messages from a certain processor core 110 or to provide DVM messages to a certain processor core 110, the DVM hub 114 may obtain the DVM message from or send the DVM message to another DVM hub 114 that is in data communication with that processor core 110.

In some implementations, a DVM hub 114 obtains a DVM message from a processor core 110. The DVM message may include a processor core identifier of the processor core 110 that generated or sent the DVM message. The DVM hub 114 may determine one or more recipient processor cores 110 for the DVM message. The DVM hub 114 may determine the one or more recipient processor cores 110 based on the processor core identifier.

In one implementation, the DVM hub 114 includes a processor core-partition map. The processor core-partition map may include one or more entries, and each entry may include a processor core identifier and a corresponding partition. The corresponding partition may include the partition to which the processor core 110 that is identified by the corresponding processor core identifier belongs. As an example, the processor core-partition map for the computing device 100 of FIG. 2 may be:

| Processor Core Identifier | Partition |
|---|---|
| 0 | 0 |
| 1 | 1 |
| 2 | 1 |
| 3 | 2 |
| 4 | 3 |
| 5 | 3 | where processor core identifier "0" identifies the processor core 110A, processor core "1" identifies the processor core 110B, processor core "2" identifies the processor core 110C, processor core "3" identifies the processor core 110D, processor core "4" identifies the processor core 110E, processor core "5" identifies the processor core 110F, partition "0" indicates that the corresponding processor core (in the example of FIG. 2, processor core 110A) does not belong to a partition, partition "1" identifies the partition 202A, partition "2" identifies the partition 202B, and partition "3" identifies the partition 202C.

In some implementations, the management core 110A executing instructions to partition the one or more processor cores 110B-F into the one or more partitions 202A-C includes configuring the processor core-partition map of the DVM hub 114 with the one or more entries. For example, the management core 110A may generate the processor core-partition map with its entries indicating which processor cores 110B-F belong to which partitions 202A-C and may provide the processor core-partition map to the DVM hub 114.

In one or more implementations, the DVM hub 114 determining, based on the processor core identifier of the DVM message, the one or more recipient processor cores 110 for the DVM message may include the DVM hub 114 identifying, from the processor core-partition map and based on the processor core identifier, a partition to which the processor core identified by the processor core identifier belongs. For example, using the example, processor core-partition map above, the DVM hub 114 may receive a DVM message that includes a processor core identifier of "4" (indicating the DVM message was sent by the processor core 110E). The DVM hub 114 may find the processor core identifier "4" in the processor core identifier entry of he processor core-partition map and identify the corresponding partition as "3" (i.e., the partition 202C).

In one implementation, the DVM hub 114 may then determine the one or more recipient processor cores 110 for the DVM message. The DVM hub 114 may include a partition-processor core map. The partition-processor core map may include one or more entries, and each entry may include a partition 202 and one or more corresponding processor core identifiers. The corresponding processor core identifiers may include the one or more identifiers for processor cores 110 that belong to the partition 202 identified by the corresponding partition. As an example, the partition map-processor core for the computing device 100 of FIG. 2 may be:

| Partition | Processor Core Identifier(s) |
|---|---|
| 1 | 1, 2 |
| 2 | 3 |
| 3 | 4, 5 | where partition "1" identifies the partition 202A, partition "2" identifies the partition 202B, partition "3" identifies the partition 202C, processor core "1" identifies the processor core 110B, processor core "2" identifies the processor core 110C, processor core "3" identifies the processor core 110D, processor core "4" identifies the processor core 110E, and processor core "5" identifies the processor core 110F.

In some implementations, the management core 110A executing instructions to partition the one or more processor cores 110B-F into the one or more partitions 202A-C includes configuring the partition map-processor core of the DVM hub 114 with the one or more entries. For example, the management core 110A may generate the partition-processor core map with its entries indicating which processor cores 110B-F belong to which partitions 202A-C and may provide the partition-processor core map to the DVM hub 114.

In one or more implementations, the DVM hub 114 determining, based on the processor core identifier of the DVM message, the one or more recipient processor cores 110 for the DVM message may include the DVM hub 114 identifying, from the partition-processor core map and based on the partition identifier, the one or more processor cores 110 belonging to the partition. Continuing the example, the DVM hub 114 may find the entry in the partition-processor core map where the partition identifies "3," which results in the DVM hub 114 identifying the processor cores identifiers "4" (processor core 110E) and "5" (processor core 110F). In one implementation, the DVM hub 114 may determine the one or more recipient processor cores 110 for the DVM message using functionality other than using the processor core-partition and/or the partition-processor core map(s).

In some implementations, the DVM hub 114 does not determine that the processor core 110 that sent the DVM message as one of the recipient processor cores 110. The DVM hub 114 may provide the DVM message to the identified one or more recipient processor cores 110. For example, the DVM hub 114 may send the DVM message to each processor core 110 determined to be a recipient processor core 110.

In some implementations, the management core 110A may further configure the DVM hub 114 to perform a preventative action associated with the DVM message. A preventative action may include an action that assists in preventing the DVM message from being provided to a processor core 110 outside of the partition of the processor core 110 that generated the DVM message. The preventative action may include sending a response to the processor core 110 that generated the DVM message.

In one or more implementations, the DVM message includes a translation lookaside buffer (TLB) invalidation instruction. A processor core 110 may include a memory cache that stores recent translations of DVM to physical memory, and this memory cache can be referred to as a TLB. Sometimes, a first processor core 110B interacting with the DVM can cause that processor core's 110B TLB or the TLB of another processor core 110C-F to be out of date. Thus, the first processor core 110B can send a TLB invalidation instruction to the other processor cores 110C-F so that the other processor cores 110C-F will not use outdated data in their respective TLBs.

In one implementation, a DVM hub 114 receives a TLB invalidation instruction. The DVM hub can determine the recipient processor core(s) 110, send the TLB invalidation instruction to the recipient processor core(s) 110, and perform a preventative action. The preventative action can include the DVM hub 114 sending a completion response to the processor core 110 that sent the TLB invalidation instruction. The preventative action can include the DVM hub 114 not providing the TLB invalidation instruction to processor cores 110 outside of the partition 202 of the processor core 110 that generated the TLB invalidation instruction.

In some implementations, the DVM message includes a cache invalidation instruction. A processor core 110 may include a memory cache that stores contents of external memory (e.g., some of the contents stored in the first memory device 120A). Sometimes, a first processor core 110B interacting with the external memory can cause that processor core's 110B memory cache or the memory cache of another processor core 110C-F to be out of date. Thus, the first processor core 110B can send a cache invalidation instruction to the other processor cores 110C-F so that the other processor cores 110C-F will not use outdated data in their respective caches.

In one implementation, a DVM hub 114 receives a cache invalidation instruction. The DVM hub 114 determine the recipient processor core(s) 110, send the cache invalidation instruction to the recipient processor core(s) 110, and perform a preventative action. The preventative action can include the DVM hub 114 sending a completion response to the processor core 110 that sent the cache invalidation instruction. The preventative action can include the DVM hub 114 not providing the cache invalidation instruction to processor cores 110 outside of the partition 202 of the processor core 110 that generated the cache invalidation instruction.

In one or more implementations, the DVM message includes a branch predictor invalidation instruction. A processor core 110 may include a branch predictor, which may include a component that attempts to predict the outcome of a branch instruction prior to the execution of the branch instruction. Sometimes, a first processor core 110B can send a branch predictor invalidation instruction to another processor cores 110C-F so that the other processor cores 110C-F will not use the prediction generated by their respective branch predictor or so that other data associated with the branch predictor is invalidated.

In one implementation, a DVM hub 114 receives a branch predictor invalidation instruction. The DVM hub 114 can determine the recipient processor core(s) 110, send the branch predictor invalidation instruction to the recipient processor core(s) 110, and perform a preventative action. The preventative action can include the DVM hub 114 not providing the branch predictor invalidation instruction to processor cores 110 outside of the partition 202 of the processor core 110 that generated the branch predictor invalidation instruction.

In one or more implementations, the DVM message includes a DVM synchronization instruction. A first processor core 110B can send a DVM synchronization instruction to another processor core 110C to determine if a previously issued DVM operation has been completed. In some implementations, a DVM hub 114 receives a DVM synchronization instruction. The DVM hub 114 can determine the recipient processor core(s) 110, send the DVM synchronization instruction to the recipient processor core(s) 110, and perform a preventative action. The preventative action can include the DVM hub 114 sending a completion response to the processor core 110 that sent the DVM synchronization instruction. The preventative action can include the DVM hub 114 not providing the DVM synchronization instruction to processor cores 110 outside of the partition 202 of the processor core 110 that generated the branch predictor invalidation instruction.

In one implementation, the management core 110A configuring an interrupt interposer 116 includes configuring the interrupt interposer 116 to store the processor core identifier of each processor core 110 that is in the partition 202 to which the interrupt interposer 116 belongs. A processor core identifier may include data that uniquely identifies the associated processor core 110 from among the other processor cores 110 of the computing device 100. For example, the interrupt interposer 116B of FIG. 2 can store the processor core identifier of the processor core 110B and the processor core identifier of the processor core 110C. In some implementations, the interrupt interposer 116B does not store the processor core identifier of the processor core 110B that is associated with the interrupt interposer 116B. The management core 110A can configure the interrupt interposer 116B to prevent an interrupt that originates from a processor core 110B or 110C from being provided to a processor core 110A, D-F that is outside of the partition 202A to which the processor core 110B or 110C belongs.

Figure 3:
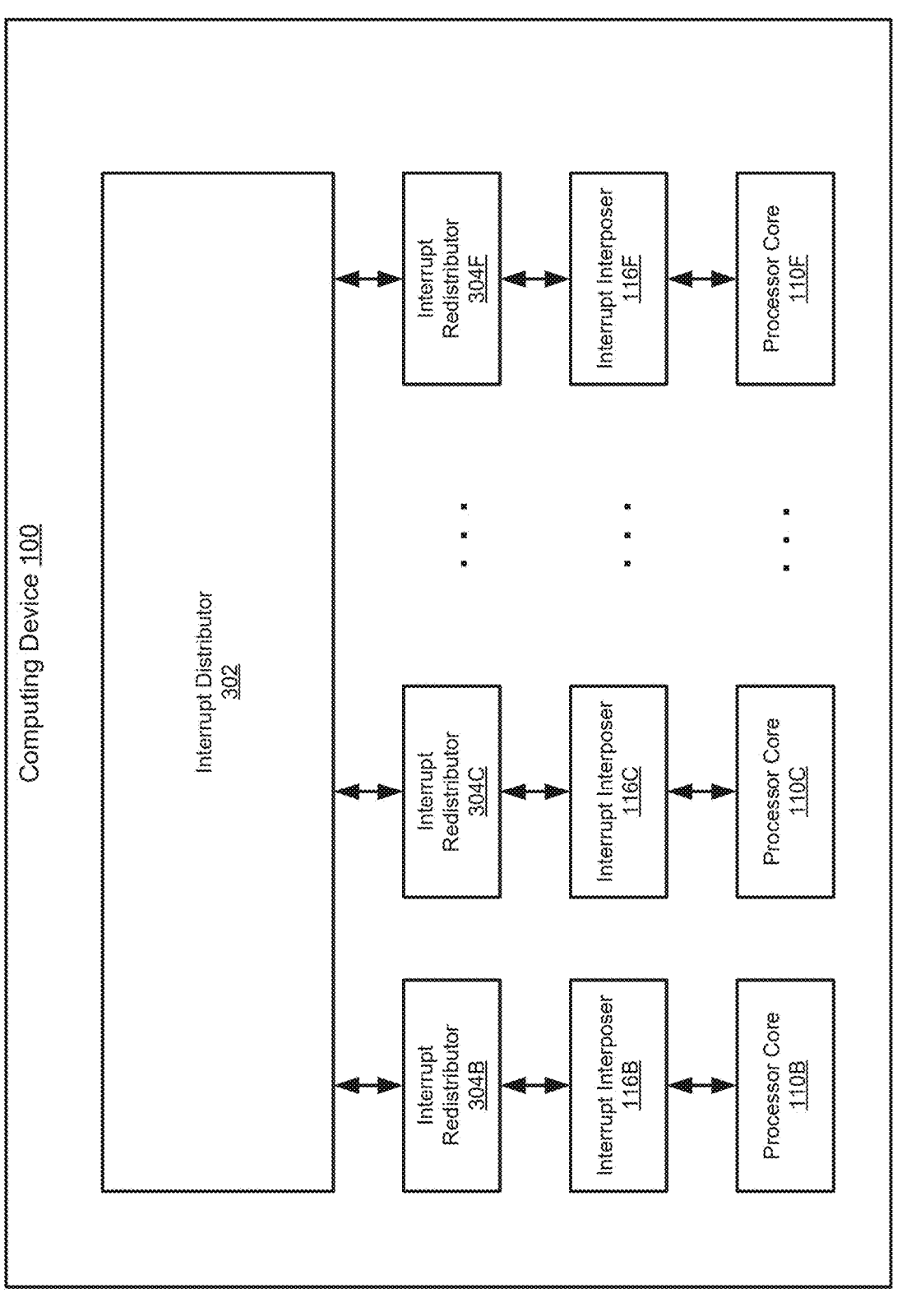
FIG. 3 schematically illustrates a portion of an example computing device for hardware partitions for a cloud server in which some aspects of the present disclosure may be implemented, in accordance with one or more embodiments.

FIG. 3 depicts a portion of the computing device 100, including the processor cores 110B-F and the interrupt interposers 116B-F. The computing device 100 may further include one or more interrupt distributors 302. An interrupt distributor 302 may include a component that provides routing or priority configuration for interrupts. The computing device 100 may include one or more interrupt redistributors 304B-F. A processor core 110B can be associated with an interrupt redistributor 304. An interrupt redistributor 304 may include a component that manages the prioritization or delivery of interrupts to a processor core 110B, stores configuration data related to interrupts, or assists the associated processor core 110B with other interrupt-related functionality. An interrupt interposer 116B can be disposed between an interrupt redistributor 304B and the associated processor core 110B. In one implementation, a processor core 110B provides a first interrupt request to the interrupt interposer 116B. The interrupt interposer 116B can generate one or more second interrupt requests based on the first interrupt request in order to prevent an interrupt from being provided to a processor core 110C-F outside of the partition 202 to which the processor core 110B that provided the first interrupt request belongs. The interrupt interposer 116B can send the one or more second interrupt requests to the interrupt redistributor 304B associated with the processor core 110B. The interrupt redistributor 304B can, for each second interrupt request, generate an interrupt based on the respective interrupt request, and the interrupt redistributor 304B can provide the one or more interrupts to the interrupt distributor 302, which can route the one or more interrupts to the one or more destination processor cores 110C-F.

In one implementation, the first interrupt includes a broadcast interrupt. A broadcast interrupt may include an interrupt configured to be sent to all processor cores 110A-F of the computing device 100, all processor cores 110A-F within an affinity cluster of the computing device 100, or some other group of processor cores 110A-F. The interrupt interposer 116B preventing the first interrupt originating from the associated processor core 110B from being provided to a processor core 110A-F that is outside the partition 202A of the associated processor core 110B may include the interrupt interposer 116B generating an interrupt request destined for each processor core 110C in the partition 202A of the associated processor core 110B (the interrupt interposer 116B may not generate an interrupt request destined for the associated processor core 110B). Thus, the interrupt interposer 116B can replace the broadcast interrupt request with multiple interrupt requests, and each interrupt request can be configured to cause a corresponding second interrupt be sent to a respective processor core 110C in the partition 202A.

In some implementations, the first interrupt includes a non-broadcast interrupt. A non-broadcast interrupt may include an interrupt configured to be sent to a list of specific processor cores 110A-F, and the interrupt may include the list of processor cores 110A-F. The interrupt interposer 116B preventing the first interrupt originating from the associated processor core 110B from being provided to a processor core 110A-F that is outside the partition 202A of the associated processor core 110B may include the interrupt interposer 116B removing, from the list of processor cores 110A-F of the first interrupt request, processor core identifiers that identify processor cores 110A, D-F that are not in the same partition 202A as the associated processor core 110B. Removing a processor core identifier from the list may include masking the list against the processor core identifiers of the processor cores 110B-C in the partition 202A, zeroing out the processor cores identifiers of processor cores 110A, D-F outside of the partition 202A in the list, or some other action.

Responsive to the interrupt interposer 116B generating the one or more second interrupt requests, as discussed above, the interrupt interposer 116B can provide the second interrupt requests to the associated interrupt redistributor 304B. The interrupt redistributor 304B can generate the one or more second interrupts and cause them to be provided to the destined one or more processor cores 110C-F that belong to the same partition 202 as the associated processor core 110B. The interrupt redistributor 304B can provide the one or more second interrupts to the interrupt distributor 302, which can route the one or more second interrupts to their respective target processor cores 110C-F.

In some implementations, the one or more processor cores 110A-F includes an IO processor core 110. The IO processor core 110 can execute instructions that emulate one or more IO devices of the computing device 100. In one implementation, the IO processor core 110 or the management core 110A executing their respective instructions includes allocating an emulated IO device of the one or more emulated IO devices to a partition 202 of the one or more partitions 202A-C. In this manner, each partition 202 may include a set of emulated IO devices that interact only with the components of the partition 202 to which the emulated IO devices are allocated. The IO processor core 110 emulating the one or more emulated IO devices can prevent data associated with different partitions 202A-C and provided to an emulated IO device or received from an emulated IO device from being combined. The IO devices emulated by the IO processor core 110 may include a peripheral component interconnect (PCI) device, a memory management unit (MMU), an interrupt distributor, and interrupt redistributor, a serial port, a clock, a power management interface, or some other IO device. In some implementations, the management core 110A intercepts some accesses to the memory devices 120A-B where the memory accesses are related to IO device functionality.

FIG. 4 is a flowchart illustrating one embodiment of a method 400 for hardware partitions for a cloud server, in accordance with some implementations of the present disclosure. A processing device, having one or more central processing units (CPU(s)), one or more graphics processing units (GPU(s)), and/or memory devices communicatively coupled to the one or more CPU(s) and/or GPU(s) can perform the method 400 and/or one or more of the method's 400 individual functions, routines, subroutines, or operations. In certain implementations, a single processing thread performs the method 400. Alternatively, two or more processing threads can perform the method 400, each thread executing one or more individual functions, routines, subroutines, or operations of the method. In an illustrative example, the processing threads implementing the method 400 can be synchronized (e.g., using semaphores, critical sections, and/or other thread synchronization mechanisms). Alternatively, the processing threads implementing the method 400 can be executed asynchronously with respect to each other. Various operations of the method 400 can be performed in a different (e.g., reversed) order compared with the order shown in FIG. 4. Some operations of the method 400 can be performed concurrently with other operations. Some operations can be optional. In some implementations, the management core 110A performs one or more operations of the method 400 by executing firmware or other instructions, as discussed herein. In other implementations, a separate electronic device in data communication with the computing device 100 performs one or more operations of the method 400, as discussed herein.

At block 410, processing logic partitions one or more processor cores 110B-F into one or more partitions 202A-C. Partitioning the processor cores 110B-F into the one or more partitions 202A-C may include instructions (e.g., firmware executing on the management core 110A) configuring the one or more processor cores 110B-F for use in the one or more partitions 202A-C. For example, as explained above, the instructions can cause the one or more processor cores 110B-F that are to be included in the one or more partitions 202A-C to reboot. As discussed above, a first processor core 110B may include a SAM 112B that includes one or more entries, and each entry may include a block of memory and a corresponding channel leading to the block of memory. Partitioning the one or more processor cores 110B-F into the one or more partitions 202A-C may include configuring the SAM 112B by removing an entry of the one or more entries where the removed entry includes a channel to a block of memory that is not assigned to the first partition 202A.

At block 420, processing logic configures at least one DVM hub 114 to obtain a first DVM message from a first processor core 110B of the one or more processor cores 110B-F. The first DVM message may include a processor core identifier of the first processor core 110B. Processing logic further configures the at least one DVM hub 114 to determine, based on the processor core identifier of the first DVM message, one or more recipient processor cores 110 of the one or more processor cores 110 for the first DVM message. Processing logic further configures the at least one DVM hub 114 to provide the first DVM message to the identified one or more recipient processor cores 110. For example, as discussed above, the instructions (e.g., firmware executing on the management core 110A) may include the instructions providing a processor core-partition map to the DVM hub 114. Th instructions can configure the DVM hub 114 to perform one or more preventative actions associated with the first DVM message.

At block 430, processing logic configures an interrupt interposer 116B to be associated with the first processor core 110B (e.g., the processor core 110 associated with the interrupt interposer 116B). Configuring the interrupt interposer 116B may include the instructions (e.g., firmware executing on the management core 110A) configuring the interrupt interposer 116B to prevent a first interrupt originating from the associated processor core 110B from being provided to a processor core 110D-F that is outside of the partition 202A of the associated processor core 110B. Configuring the interrupt interposer 116B may include the interrupt interposer 116 storing the processor core identifier of each processor core 110B-C that is in the partition 202A to which the interrupt interposer 116B belongs.

At block 440, processing logic configures the interrupt interposer 116B to prevent a first interrupt originating from the first processor core 110B from being provided to a processor core 110C-F that is outside of the first partition 202A. As discussed above, for a broadcast interrupt, the interrupt interposer 116B can cause one or more second interrupts based on the first interrupt to be provided to each processor core 110B-C in the first partition 202A. The interrupt interposer 116B can generate an interrupt request destined for each processor core 110C-F in the partition 202A and provide the interrupt requests to the interrupt redistributor 304B to generate the one or more corresponding second interrupts, and the interrupt redistributor 304B and the interrupt distributor 302 can route the second interrupts to the respective processor cores 110C within the partition 202A, as discussed above. For a non-broadcast interrupt, the interrupt interposer 116B can remove, from the list of processor cores 110B-F of the interrupt request, processor core identifiers that identify processor cores 110A, D-F that are not in the same partition 202A as the associated processor core 110B.

Figure 5:
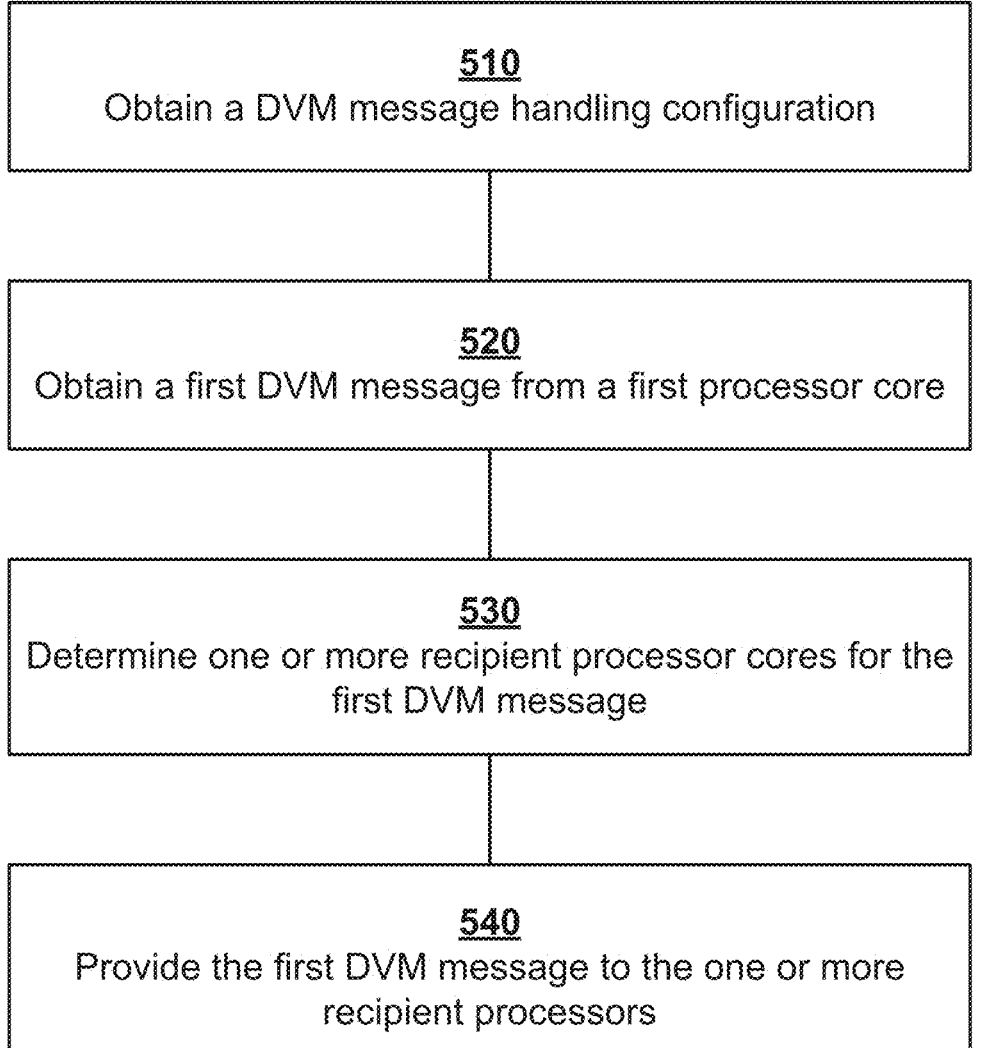
FIG. 5 depicts a flowchart illustrating an example method for practicing some aspects of the present disclosure, in accordance with one or more embodiments.

FIG. 5 is a flowchart illustrating one embodiment of a method 500 for operating a DVM hub 114, in accordance with some implementations of the present disclosure. A DVM hub 114 can perform the method 500 and/or one or more of the method's 500 individual functions, routines, subroutines, or operations. In certain implementations, a single processing thread performs the method 500. Alternatively, two or more processing threads can perform the method 500, each thread executing one or more individual functions, routines, or operations of the method. In an illustrative example, the processing threads implementing the method 500 can be synchronized (e.g., using semaphores, critical sections, and/or other thread synchronization mechanisms). Alternatively, the processing threads implementing the method 500 can be executed asynchronously with respect to each other. Various operations of the method 500 can be performed in a different (e.g., reversed) order compared with the order shown in FIG. 5. Some operations of the method 500 can be performed concurrently with other operations. Some operations can be optional.

At block 510, a DVM hub 114 obtains a DVM message handling configuration. The DVM message handing configuration may include instructions, configurations, or other data that can configure the DVM hub 114 to determine one or more recipient processor cores for a DVM message, send the DVM message to the recipient processor core(s) 110, or perform preventive actions associated with the DVM message. For example, obtaining the DVM message handing configuration may include obtaining a processor core-partition map, as discussed above. In one implementation, the DVM hub 114 obtains the DVM message handling configuration from the management core 110A.

At block 520, the DVM hub 114 obtains a first DVM message from a first processor core 110B. The first DVM message may include a processor core identifier of the first processor core 110B. At block 530, the DVM hub 114 determines, based on the processor core identifier of the first DVM message, one or more recipient processor cores 110 for the first DVM message. For example, as discussed above, the DVM hub 114 may use the processor core-partition map to determine one or more processor cores 110 that belong to the same partition 202A as the first processor core 110B. The one or more recipient processor cores 110 may include the one or more processor cores 110 that belong to the same partition 202A as the first processor core 110B. At block 540, the DVM hub provides the first DVM message to the one or more recipient processor cores 110.

In some implementations of the method 500, the DVM hub 114 performs a preventative action. The preventative action may prevent the DVM message from affecting one or more computing resources outside of the partition 202 to which the first processor core 110B belongs. of the first partition 202A. For example, as discussed above, the DVM message may include a TLB invalidation instruction, and the preventative action may include the DVM hub 114 sending a completion response to the first processor core 110B that sent the TLB invalidation instruction. The preventative action may further include the DVM hub 114 not providing the TLB invalidation instruction to a processor core 110 that does not belong to the first partition 202A (i.e., the partition 202 to which the first processor core 110B belongs).

FIG. 6 is a flowchart illustrating one embodiment of a method 600 for operating an interrupt interposer 116, in accordance with some implementations of the present disclosure. An interrupt interposer 116 can perform the method 600 and/or one or more of the method's 600 individual functions, routines, subroutines, or operations. In certain implementations, a single processing thread performs the method 600. Alternatively, two or more processing threads can perform the method 600, each thread executing one or more individual functions, routines, subroutines, or operations of the method. In an illustrative example, the processing threads implementing the method 600 can be synchronized (e.g., using semaphores, critical sections, and/or other thread synchronization mechanisms). Alternatively, the processing threads implementing the method 600 can be executed asynchronously with respect to each other. Various operations of the method 600 can be performed in a different (e.g., reversed) order compared with the order shown in FIG. 6. Some operations of the method 600 can be performed concurrently with other operations. Some operations can be optional.

At block 610, an interrupt interposer 116B associates with a processor core 110B. The processor core 110B may belong to a first partition 202A. If the first partition 202A includes multiple processor cores 110B-C, block 610 may include the interrupt interposer 116B associating with each processor core 110B-C that belongs to the first partition 202A. Associating with a processor core 110B may include the interrupt interposer 116 storing the processor core identifier of the associated processor core 110B.

At block 620, the interrupt interposer 116B obtains a first interrupt. The first interrupt may originate from the processor core 110B that is associated with the interrupt interposer 116B. At block 630, the interrupt interposer 116B determines that the first interrupt is destined for one or more processor cores 110 that are outside of the first partition 202A. Determining the first interrupt is destined for one or more one or more processor cores 110 that are outside of the first partition 202A may include examining the type of the first interrupt (e.g., broadcast, non-broadcast, etc.), a destination list of the first interrupt (e.g., a list of processor core identifiers corresponding to processor cores 110 to which the interrupt is to be sent), or other data contained in or associated with the first interrupt.

At block 640, the interrupt interposer 116B prevents the first interrupt from being provided to a processor core 110D-F that is outside of the first partition 202A. As discussed above, for a broadcast interrupt, the interrupt interposer 116B can cause one or more second interrupts based on the first interrupt to be provided to each processor core 110B-C in the first partition 202A. For a non-broadcast interrupt, the interrupt interposer 116B can remove, from the list of processor cores 110B-F of the first interrupt, processor core identifiers that identifies processor cores 110A, D-F that are not in the same partition 202A as the processor core 110B.

In one implementation, the one or more processor cores 110A-F are disposed on the same computing device 100. The computing device 100 may include a system on a chip (SoC), an application-specific integrated circuit (ASIC), or some other integrated circuit (IC). The one or more DVM hubs 114, the one or more interrupt interposers 116A-F, or other components discussed herein can be disposed on the same computing device 100.

In some implementations, the one or more processor cores 110 of a partition 202 execute firmware or a bootloader provided by an end user of the cloud computing system. For example, the management core 110A can generate a partition 202 that includes one or more components (e.g., processor cores 110, memory blocks, etc.), and the management core 110A can receive the firmware or bootloader and store them in a memory block of the partition 202. The management core 110A can provide the memory locations of the firmware or bootloader a processor core 110 of the partition so the processor core 110A can execute the firmware or bootloader.

In some implementations, a partition 202 is configured to execute a confidential compute environment. Confidential computing includes providing a hardware-based trusted execution environment (TEE) that executes on one or more hardware components of a computing device. The TEE may include a secure enclave that is isolated from data and hardware outside of the TEE, making the data and processes within the TEE not directly accessible to other hardware components, an operating system, or other software of the computing device that includes the TEE. The TEE can be secured using embedded encryption keys, and embedded attestation operations can prevent access to those keys except for authorized application code. Attempts by code that is not authorized can result in denial of the keys to the code. Confidential computing can include the TEE receiving encrypted data, the TEE using the encryption keys to decrypt the encrypted data, the TEE processing the unencrypted data using authorized code, the TEE encrypting the data resulting from the processing, and the TEE outputting the encrypted data from the TEE. In this manner, in some instances, encrypted data may only be processed in the TEE where it is isolated and secure from other portions of the computing device.

In one implementation, a partition 202 may include a TEE. The TEE may include the one or more processor cores 110, one or more DVM hubs 114, one or more interrupt interposers, one or more blocks of memory of the one or more memory devices 120, or other components of the partition 202. The TEE may attest the partition's 202 initial state and encrypt the data in the blocks of memory that belong to the partition 202. The TEE may use the partition 202 isolation mechanisms and processes discussed herein to prevent access by unauthorized code associated with other partitions 202 or other computing devices. In some implementations, the TEE include a secure enclave within a processor core 110 that is isolated from data and hardware outside the processor core 110, making the data and processes within the TEE not directly accessible to other hardware or software of the computing device 100.

Figure 7:
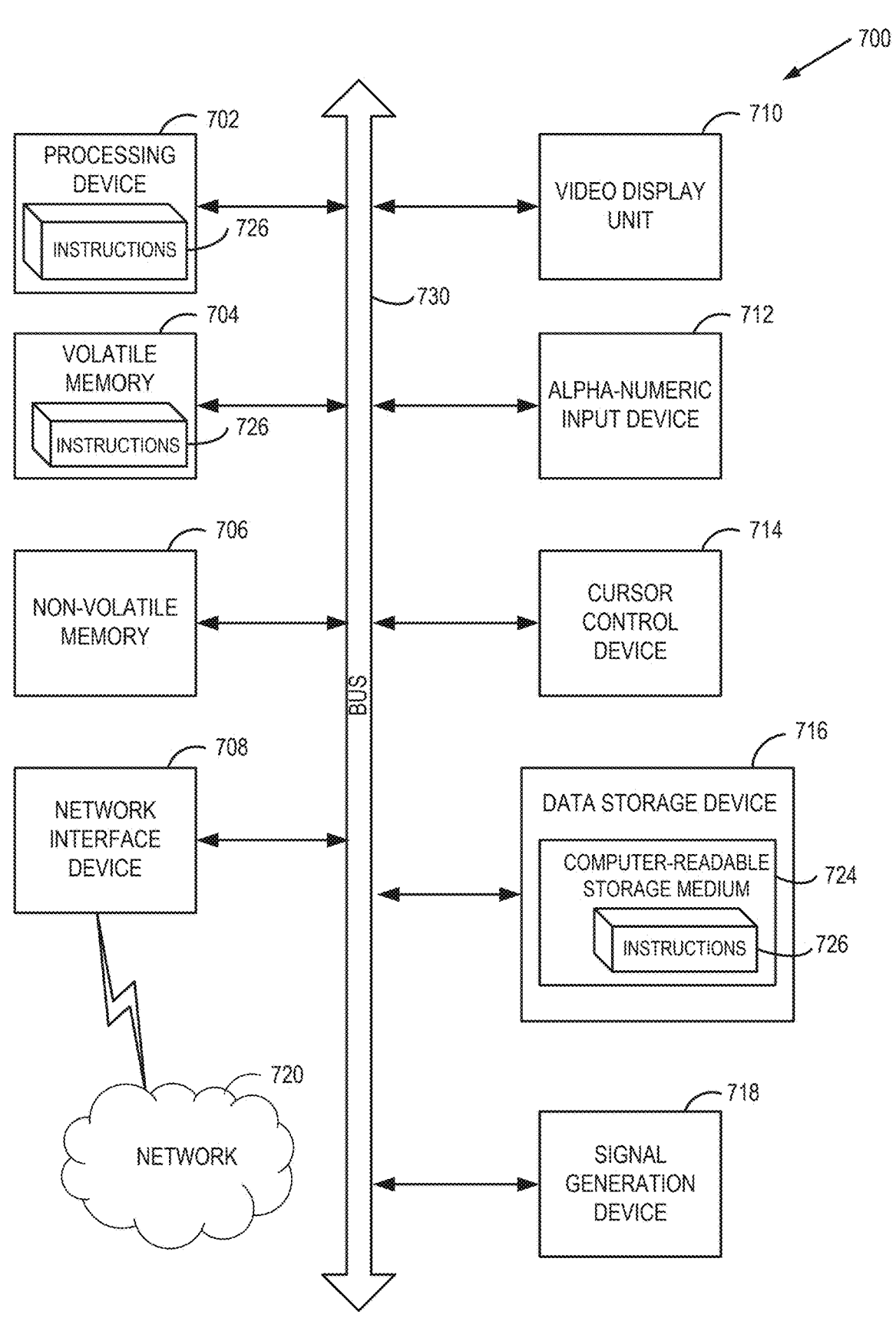
FIG. 7 depicts a block diagram of an example computer device capable of creating hardware partitions for a cloud server, in accordance with some implementations of the present disclosure.

FIG. 7 is a block diagram illustrating an example computer system 700, in accordance with implementations of the present disclosure. The computer system can be a computing device (e.g., the computing device 100 of FIG. 1) or other device discussed herein. The computer system 700 can operate in the capacity of a server or an endpoint machine in endpoint-server network environment, or as a peer machine in a peer-to-peer (or distributed) network environment. The machine can be some other type of machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processing device 702, a volatile memory 704, a non-volatile memory 706 (e.g., flash memory, static random-access memory (SRAM), etc.), and/or a data storage device 716, which communicate with each other via a bus 730.

The processing device 702 can represent one or more general-purpose processing devices such as a microprocessor, CPU, GPU, a processor core (e.g., a processor core 110 of FIG. 1) or the like. More particularly, the processing device 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 can also be one or more special-purpose processing devices such as an ASIC, a field programmable gate array (FPGA), a digital signal processor (DSP), network processor, or the like. The processing device 702 is configured to execute instructions 726 for performing one or more operations discussed herein.

The volatile memory 704 can include read-only memory (ROM), flash memory, dynamic random-access memory (DRAM) such as synchronous DRAM (SDRAM), double data rate (DDR SDRAM), or DRAM (RDRAM), or some other type of volatile memory. The volatile memory 704 may include the memory devices 120A-B of FIG. 1. The volatile memory 704 can store at least a portion of the instructions 726.

The computer system 700 can further include a network interface device 708. The network interface device 708 can assist in data communication between computing devices. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 718 (e.g., a speaker).

The data storage device 716 can include a non-transitory machine-readable storage medium 724 (also computer-readable storage medium) on which is stored one or more sets of instructions 726. The instructions can embody any one or more of the methodologies or functions described herein. The instructions 726 can also reside, completely or at least partially, within the volatile memory 704 and/or within the processing device 702 during execution thereof by the computer system 700, the volatile memory 704 and the processing device 702 also constituting machine-readable storage media. The instructions 726 can further be transmitted or received over a network 720 via the network interface device 708.

In one implementation, the instructions 726 include instructions for hardware partitions for a cloud server. The instructions 726 may include firmware (e.g., the firmware of the management core 110A). The instructions 726 may include the instructions for partitioning one or more components of the computing device 100 into one or more partitions 202. The instructions 726 may include instructions provided to components of the computing device 100, such as a DVM hub 114 or an interrupt interposer 116, to perform operations as discussed herein.

While the computer-readable storage medium 724 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods (e.g., the method 400, 500, or 600) are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

References throughout the disclosure to "first," "second," "third," and so on are used for clarity and differentiation purposes only and does not imply a specific order of assembly or operations. Furthermore, in some implementations, references to a "first" component and a "second" component may refer to the same component unless otherwise explicitly stated.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A system, comprising:
   a plurality of processor cores comprising a first processor core that executes instructions to partition at least a portion of the plurality of processor cores into a plurality of partitions;
   at least one distributed virtual memory (DVM) hub, wherein the DVM hub:
      obtains a first DVM message from a second processor core of the plurality of processor cores, the first DVM message including a processor core identifier of the second processor core, and
      determines, based on the processor core identifier, one or more recipient processor cores of the plurality of processor cores for the first DVM message, and
      provides the first DVM message to the one or more recipient processor cores; and
   a plurality of interrupt interposers, wherein each interrupt interposer of the plurality of interrupt interposers:
      is associated with a processor core of the plurality of processor cores, the associated processor core belonging to a partition of the plurality of partitions, and
      prevents a first interrupt originating from the associated processor core from being provided to a processor core that is outside the partition of the associated processor core.

2. The system of claim 1, wherein the at least one DVM hub comprises a processor core-partition map comprising a plurality of entries, each entry including a processor core identifier and a corresponding partition of the plurality of partitions.

3. The system of claim 2, wherein the first processor core executing instructions to partition the at least a portion of the plurality of processor cores into the plurality of partitions comprises configuring the processor core-partition map of the at least one DVM hub with the plurality of entries.

4. The system of claim 2, wherein the at least one DVM hub determining, based on the processor core identifier, the one or more recipient processor cores for the first DVM message comprises the DVM hub:
   identifying, from the processor core-partition map and based on the processor core identifier, a partition of the plurality of partitions to which the second processor core belongs; and
   determining, from the processor core-partition map and based on the identified partition, the one or more recipient processor cores.

5. The system of claim 1, wherein:
   the at least one DVM hub comprises a first DVM hub and a second DVM hub; and
   a first subset of the plurality of processor cores provides DVM messages to the first DVM hub, and a second subset of the plurality of processor cores provides DVM messages to the second DVM hub.

6. The system of claim 1, wherein:
   the system further comprises an input/output (IO) processor core that executes instructions that emulate one or more IO devices; and
   the first processor core executing the instructions to partition the at least a portion of the plurality of processor cores into the plurality of partitions comprises allocating an emulated IO device of the one or more emulated IO devices to a partition of the plurality of partitions.

7. The system of claim 1, wherein the first processor core of the plurality of processor cores is not included in any partition of the plurality of partitions.

8. A method, comprising:

partitioning a plurality of processor cores into one or more partitions;

configuring at least one distributed virtual memory (DVM) hub to:

obtain a first DVM message from a first processor core of the plurality of processor cores, the first DVM message comprising a processor core identifier of the first processor core, determine, based on the processor core identifier of the first DVM message, one or more recipient processor cores of the plurality of processor cores for the first DVM message, and provide the first DVM message to the one or more recipient processor cores;

configuring an interrupt interposer to be associated with the first processor core, the first processor core belonging to a first partition of the one or more partitions; and configuring the interrupt interposer to prevent a first interrupt originating from the first processor core from being provided to a processor core that is outside of the first partition.

9. The method of claim 8, further comprising configuring the at least one DVM hub to perform a preventative action associated with the first DVM message.

10. The method of claim 9, wherein:

the first DVM message comprises a translation lookaside buffer (TLB) invalidation instruction; and the preventative action comprises sending a completion response to the first processor core.

11. The method of claim 9, wherein:

the first DVM message comprises a cache invalidation instruction; and the preventative action comprises sending a completion response to the first processor core.

12. The method of claim 9, wherein:

the first DVM message comprises a branch predictor invalidation instruction; and the preventative action comprises sending a completion response to the first processor core.

13. The method of claim 8, wherein the plurality of processor cores is disposed on the same system on a chip (SoC).

14. The method of claim 8, wherein:

the first processor core includes a system address map (SAM) that includes a plurality of entries, each entry including a block of memory and a corresponding channel leading to the block of memory; and partitioning the plurality of processor cores into the one or more partitions comprises configuring the SAM by removing an entry of the plurality of entries, wherein the removed entry includes a channel to a block of memory that is not assigned to the first partition.

15. The method of claim 8, wherein:

the first interrupt includes a broadcast interrupt; and preventing, at the interrupt interposer, the first interrupt from being provided to a processor core that is outside of the first partition comprises causing one or more second interrupts based on the first interrupt to be provided to each processor core in the first partition.

16. A non-transitory computer-readable storage medium comprising instructions that, when executed by a processing device, cause the processing device to perform operations, comprising:

partitioning a plurality of processor cores into one or more partitions;

configuring at least one distributed virtual memory (DVM) hub to:

obtain a first DVM message from a first processor core of the plurality of processor cores, the first DVM message comprising a processor core identifier of the first processor core, determine, based on the processor core identifier of the first DVM message, one or more recipient processor cores of the plurality of processor cores for the first DVM message, and provide the first DVM message to the identified one or more recipient processor cores;

configuring an interrupt interposer to be associated with the first processor core, the first processor core belonging to a first partition of the one or more partitions; and configuring the interrupt interposer to prevent a first interrupt originating from the first processor core from being provided to a processor core that is outside of the first partition.

17. The computer-readable storage medium of claim 16, wherein the operations further configure the at least one DVM hub with a processor core-partition map comprising a plurality of entries, each entry including a processor core identifier and a corresponding partition of the one or more partitions.

18. The computer-readable storage medium of claim 16, wherein the operations further configure the DVM hub to perform a preventative action associated with the first DVM message.

19. The computer-readable storage medium of claim 16, wherein the first interrupt comprises a software-generated interrupt (SGI).

20. The computer-readable storage medium of claim 16, wherein:

the first interrupt comprises a broadcast interrupt; and preventing the first interrupt from being provided to a processor core that is outside the partition of the associated first processor core comprises causing one or more second interrupts based on the first interrupt to be provided to each processor core in the partition of the associated first processor core.

* * * * *